US006031655A

United States Patent [19]
Yagyu

[11] Patent Number: 6,031,655
[45] Date of Patent: Feb. 29, 2000

[54] SPATIAL LIGHT MODULATOR AND PICTURE-FORMING APPARATUS INCLUDING SAME

[75] Inventor: Mineto Yagyu, Sagamihara, Japan

[73] Assignee: Canon Kabushiki Kaisha, Tokyo, Japan

[21] Appl. No.: 09/152,101

[22] Filed: Sep. 14, 1998

[30] Foreign Application Priority Data

Sep. 12, 1997 [JP] Japan .................................... 9-249191

[51] Int. Cl.[7] ..................................................... G02B 26/00
[52] U.S. Cl. ............................................................ 359/292
[58] Field of Search ............................ 359/292; 250/226; 349/29, 25, 116

[56] References Cited

U.S. PATENT DOCUMENTS 4,052,208 10/1977 Martinelli .................................. 96/1.5
4,916,470 4/1990 Kovac et al. ........................... 346/160
5,731,797 3/1998 Akiyama et al. ......................... 345/97

*Primary Examiner*—Ricky Mack
*Attorney, Agent, or Firm*—Fitzpatrick,Cella, Harper & Scinto

[57] ABSTRACT

A spatial light modulator is formed of a pair of transparent substrates, and a photoconductor layer, an optical modulation layer and a color filter layer disposed in lamination between the substrates. The photoconductor layer is designed to have a spectral sensitivity characteristic including an average sensitivity to blue light, an average sensitivity to green light and an average sensitivity to red light, of which a maximum and a minimum provide a ratio. $S_{MAX}/S_{MIN}$ therebetween of at most 10, and a spectral transmittance characteristic including an average transmittance in a wavelength range of 420–480 nm, an average transmittance in a wavelength range of 520–560 nm and an average transmittance in a wavelength range of 600–660 nm, of which a maximum and a minimum provide a ratio $T_{MAX}/T_{MIN}$ of at most 10. As a result, it becomes possible to provide a compact picture-forming and display apparatus of a see-through type by disposing a white writing light source and a white reading light source on a same side of the spatial light modulator.

21 Claims, 17 Drawing Sheets

SPATIAL LIGHT MODULATOR AND PICTURE-FORMING APPARATUS INCLUDING SAME

FIELD OF THE INVENTION AND RELATED ART

The present invention relates to a spatial light modulator (spatial light modulation device, hereinafter sometimes abbreviated as "SLM") for use in a display apparatus, a picture-forming apparatus, etc., and more particularly to a structure of such a spatial light modulator.

A spatial light modulator proposed heretofore for use in a display apparatus, a picture-forming apparatus, etc., has a structure as shown in FIG. 23, including a liquid crystal layer 23 as an optical modulation layer and a photoconductor layer 24 as a photoelectric conversion layer between a pair of substrates 21 and 22. The spatial light modulator shown in FIG. 23 further includes transparent electrodes 25 and 26, alignment films 27 and 28, and a mirror layer 29.

When a spatial light modulator 20 having such a structure is illuminated with picture data-carrying light (writing light) incident thereto from the lower substrate 22 side, the photoconductor layer 24 is caused to have a locally lowered resistivity depending on its light quantity. If the resistivity is lowered in such a manner, the photoconductor layer is provided with a resistivity distribution over its layer extension, so that locally different effective voltages are applied to the liquid crystal layer 23, wherein liquid crystal molecules are caused to have different orientations depending on the locally different effective voltages.

As a result, the liquid crystal layer 23 forms a latent image due to its molecular orientation distribution, so that if the liquid crystal layer illuminated with reading light incident thereto from the upper substrate 21 side, the reading light is modulated by the liquid crystal to provide reflected light carrying image data due to the function of the reflecting mirror layer 29. The mirror layer 29 may have a structure wherein dielectric layers having mutually different refractive indices are alternately disposed to form a laminate film so as to provide a good reflectance and a high resistance in a planar direction.

On the other hand, FIG. 24 illustrates a sheet of SLM designed for optical modulation for color picture display, wherein a miller layer 29 is patterned in squares and color filter segments R, G and B are disposed corresponding thereto. The SLM further includes a transparent insulating film 30, a masking layer 31 and a spacer 32.

In case of using a conventional reflecting-type SLM having no color filter (CF) as shown in FIG. 23, three sheets of SLM are required for R (red), B (blue) and G (green) display and three writing optical systems are required to effect a color synthesis, so that the entire apparatus is liable to be complicated and large-sized. Further, in the case of an electrophotographic image- or picture-forming apparatus, writing in the SLM has to be performed for the respective colors R, G and B, so that long step are included. Further, as the readout system requires a color separation—color synthesis system, a direct-see type display cannot be provided, but a special form of display such as a projection-type display for projecting onto a screen or a look-into reflection type display like a view finder, has to be constituted.

On the other hand, in the case of a color picture display apparatus using a single-sheet reflection-type SLM as shown in FIG. 24, writing light has to be in the form of a spot beam incident to a position corresponding to a color filter segment, so that its control requires an extremely high degree of technique and a special writing optical system is required by nature, thus giving a difficulty in providing an inexpensive apparatus. Further, color filter segments and mirror segments have to be disposed in alignment with each other in the SLM device, so that the production thereof becomes difficult and expensive.

Further, a reflection-type SLM is liable to be expensive because it includes a mirror. The mirror may be composed of a dielectric mirror or a separated metal mirror. The former-type mirror requires ten and several layers and also generally requires a vacuum production process. The latter-type mirror generally requires a mask structure so as to prevent the reading light from passing through a spacing between metals to incident to the photoconductor layer, thus resulting in a complicated structure.

If such a mirror layer is omitted, the reading light enters the photoconductor layer to disturb the written latent image, thus resulting in a picture with only a low S/N ratio.

SUMMARY OF THE INVENTION

In view of the above-mentioned problems of the prior art, an object of the present invention is to provide a spatial light modulator capable of writing and reading a color picture or image by using writing light and reading light incident thereto from an identical substrate side (or color filter side).

Another object of the present invention is to provide a spatial light modulator requiring no reflection mirror.

A further object of the present invention is to provide a spatial light modulator allowing a simple illumination system for writing light.

According to the present invention, there is provided a spatial light modulator, comprising a pair of transparent substrates, and a photoconductor layer, an optical modulation layer and a color filter layer disposed in lamination between the substrates, wherein the photoconductor layer has a spectral sensitivity characteristic including an average sensitivity to blue light, an average sensitivity to green light and an average sensitivity to red light, of which a maximum and a minimum provide a ratio $S_{MAX}/S_{MIN}$ therebetween of at most 10, and a spectral transmittance characteristic including an average transmittance in a wavelength range of 420–480 nm, an average transmittance in a wavelength range of 520–560 nm and an average transmittance in a wavelength range of 600–660 nm, of which a maximum and a minimum provide a ratio $T_{MAX}/T_{MIN}$ of at most 10.

According to the present invention, there is also provided a picture-forming apparatus including the spatial light modulator and a writing light source disposed in a position suitable for illuminating the photoconductor layer through the color filter layer of the spatial light modulator. The picture-forming apparatus may preferably further include a reading light source disposed in a position suitable for illuminating the optical modulation layer through the color filter layer of the spatial light modulator.

As a result, it becomes possible to provide a compact picture-forming and display apparatus of a see-through type allowing writing and reading of color picture data by illuminating the spatial light modulator form a same side thereof.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
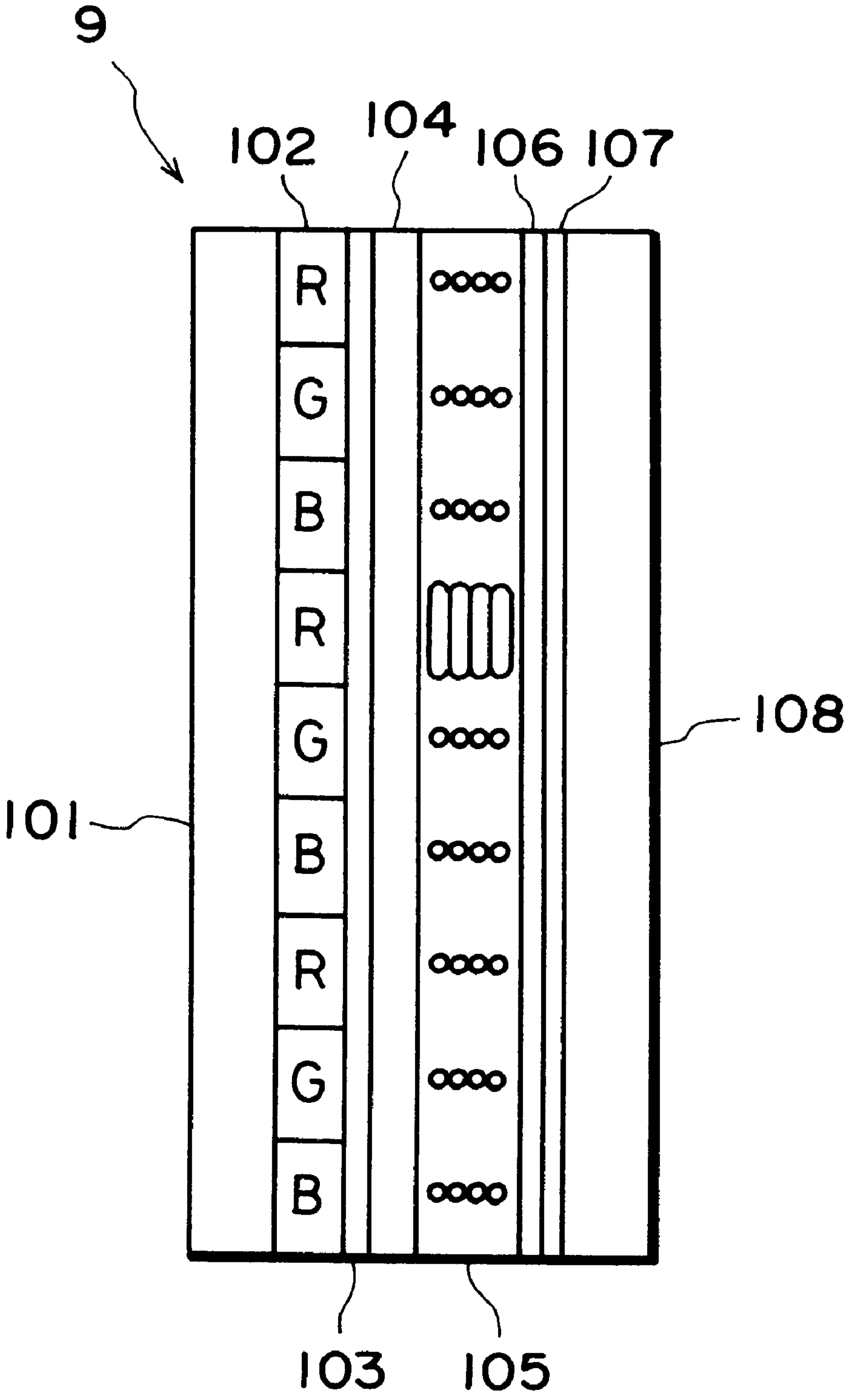
FIG. 1 is a sectional illustration of a spatial light modulator according to an embodiment of the invention.

FIG. 1 is a sectional illustration of a spatial light modulator according to an embodiment of the present invention. Referring to FIG. 1, a spatial light modulator (SLM) 9 includes a pair of transparent substrates 101 and 108, a color filter layer 102 including color filter segments of R, G and B and disposed on the substrate 101 on a side illuminated with writing light (hereinafter called "writing-side substrate"), transparent electrodes 103 and 107, a photoconductor layer (or photoelectric conversion layer) 104, a layer of optical modulation substance (hereinafter called an optical modulation layer) 105, and an alignment film 106.

The writing-side substrate 101 and the reading-side substrate 108 may be composed of glass, quartz, alumina, resin, etc., and the color filter layer may comprise a well-known pigment dispersion-type color filter, a dyed filter, etc.

Figure 2:
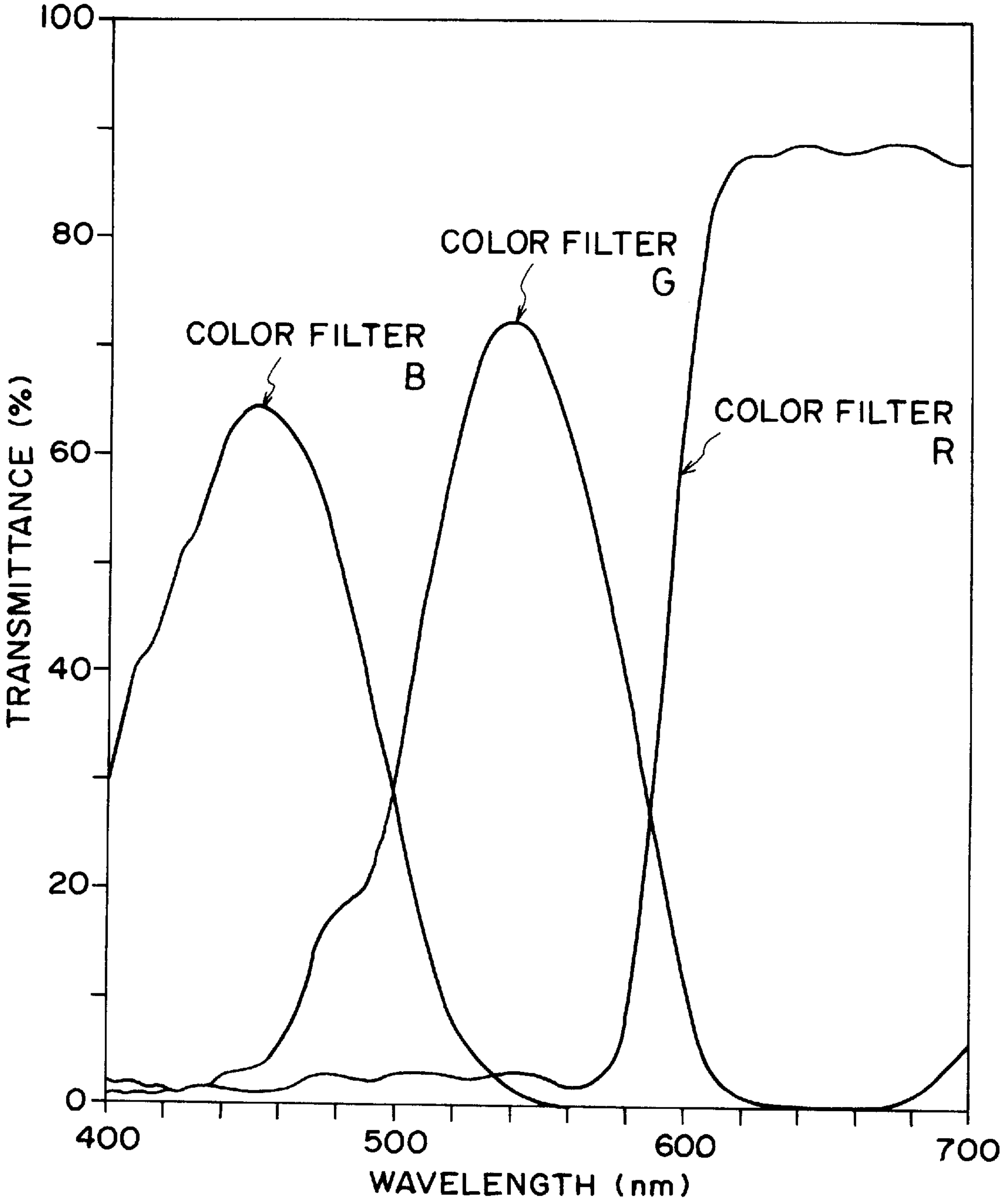
FIG. 2 is a graph showing an example of relationship between transmittance and wavelength through a color filter layer of the spatial light modulator.

The color filter layer 102 may optionally be provided with masking parts (not shown) between respective color filter segments of R, G and B or may be coated with a transparent layer (not shown) covering the color filter segments. The R, G and B color filter segments may be in the form of stripes or in a mosaic arrangement. FIG. 2 shows an example of relationship between transmittances and wavelengths for respective color filter segments of a color filter layer.

The transparent electrodes 103 and 107 may comprise, e.g., $SnO_2$ or ITO and may be formed in a layer thickness of 700–1500 Å. The alignment film may suitably comprise a polyimide, etc., formed in a thickness of 100–10,000 Å and may suitably be subjected to a rubbing treatment The periphery of the substrates 101 and 108 may be sealed with a sealing agent, such as silicone or epoxy resin.

The optical modulation substance may suitably comprise a liquid crystal, particularly a liquid crystal showing chiral smectic phase or chiral nematic phase, or a polymeric liquid crystal. A specific example of liquid crystal showing chiral smectic phase may be one comprising the following composition and showing a spontaneous polarization at 25° C. of 26 nC/cm$^2$, a smectic layer inclination angle δ at 20° C. of 0 deg., and an apparent tilt angle of 27 deg.

A:

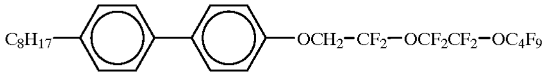

$S_X \underset{}{\overset{-8}{\rightleftarrows}} S_C \overset{50}{\rightleftarrows} S_A \overset{75}{\rightleftarrows} Iso$ (° C.)

B1:

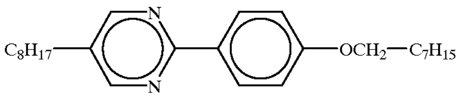

$S_X \overset{71}{\rightleftarrows} S_C \overset{80}{\rightleftarrows} S_A \overset{117}{\rightleftarrows} Iso$ (° C.)

B2:

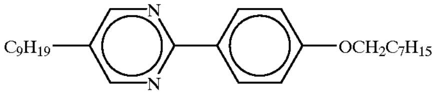

$S_X \overset{71}{\rightleftarrows} S_C \overset{85}{\rightleftarrows} S_A \overset{112}{\rightleftarrows} Iso$ (° C.)

B3:

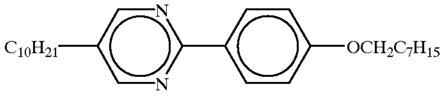

$S_X \overset{75}{\rightleftarrows} S_C \overset{87}{\rightleftarrows} S_A \overset{104}{\rightleftarrows} Iso$ (° C.)

C: (chiral dopant)

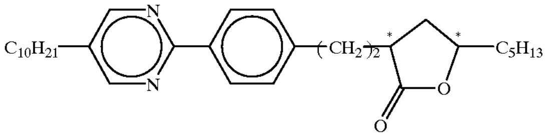

(weight ratio: A/B$_1$/B$_2$/B$_3$/C = 80/3/3/4/5)

According to our study regarding such a photoconductor layer 104, it has been found possible to write in color data through a color filter layer by using a white light source having a flat spectral characteristic if the photoconductor layer shows an average sensitivity to blue light Sb, an average sensitivity to green light Sg and an average sensitivity to red light Sr, of which a maximum Smax (i.e., the largest one among Sb, Sg and Sr) and a minimum Smin (i.e., the smallest one among Sb, Sg and Sr) provide a ratio Smax/Smin therebetween of at most 10 (≦10).

In case of Smax/Smin>10, even when the maximum sensitivity color data is written to cause full inversion of a corresponding portion of liquid crystal, the corresponding portion of liquid crystal is not substantially inverted by the minimum sensitivity color data, so that it becomes difficult to reproduce full color even if the reading light source and color filter segment areas are optimized. In case where the Smax/Smin ratio ≦5.0, ⅓ or more of the corresponding portion can be inverted by the minimum sensitivity color data, so that full color reproduction becomes easier and a natural picture or human picture can be reproduced naturally through optimization of reading light, etc.

Further, it has been found possible to read out a beautiful color picture having a good white balance if the photoconductor layer 104 shows a spectral transmittance characteristic such that the photoconductor layer shows an average transmittance Tb in a wavelength range of 420–480 nm, an average transmittance (Tg) in a wavelength range of 520–560 nm and an average transmittance Tr in a wavelength level of 600 nm 660 nm, of which a maximum Tmax (i.e., the largest one among Tb, Tg and Tr) and a minimum Tmin (i.e., the smallest one among Tb, Tg and Tr) provide a ratio Tmax/Tmin therebetween of at most 10 (≦10). If the ratio exceeds 10, it is difficult to take white balance by adjustment of reading light, thus being liable to fail in natural color reproduction. If the ratio is at most 3, the white balance adjustment becomes easier to allow natural reproduction of a human picture, etc.

By using a photoconductor layer 104 satisfying the above-mentioned conditions, it becomes possible to write in color picture data through a color filter layer by using white illumination light (latent image formation) and also possible to read out a beautiful picture with white reading light incident to the photoconductor layer 104 from the writing side (visible image formation). Thus, by using a photoconductor layer showing appropriate levels of Smax, Smin, Tmax and Tmin, it is possible to constitute a transmission-type color SLM with good performances.

In this embodiment, the photoconductor layer (or photoelectric conversion layer) 104 may preferably comprise an organic photoconductor, which is an organic semiconductor allowing a broad latitude in designing of spectral sensitivity and spectral transmittance. In this case, it is preferred that the photoconductor layer assumes a two layer-laminate structure including a charge transport layer and a charge generation layer.

More specifically, known photoconductor materials include a- (i.e., (amorphous-)Si and organic photoconductors (OPC). Such a known photoconductor material has been used for constituting a photo-sensor, a solar cell, an electrophotographic photosensitive member, etc., wherein the spectral transmittance or transmittance in visible wavelength region thereof has not been thought much of. Moreover, when such a photoconductor material is used for color picture processing, a light source, such as an LED or a laser, emitting light having a prescribed peak wavelength has been used, and therefore it has not been practiced to effect writing in a single step. In the case of a photosensor, the sensitivity thereof, i.e., an ability of generating much charge in response to light absorbed thereby, has been questioned, and little attention has been paid to the color of the photosensor.

Accordingly, SLM designers have adopted a-Si and OPC preferably used in photosensors and photosensitive members as they are for providing SLMs, and thus they have not made an approach taken by me.

Now, a process for producing a spatial light modulator based on a specific example will be described with reference to FIGS. 3A–3D.

Figure 3A:
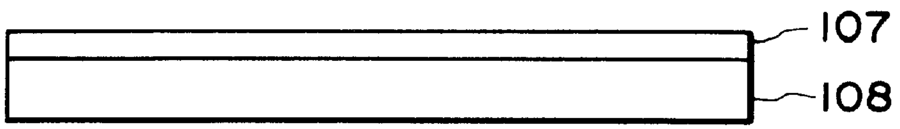
FIGS. 3A–3D are sectional views for illustrating a production process for a spatial light modulator.
Figure 3B:
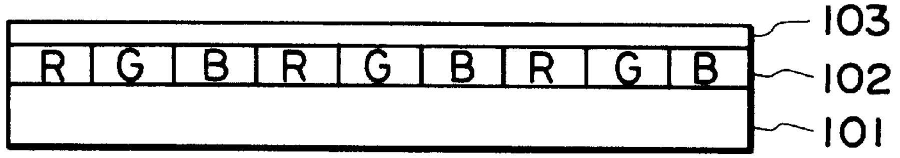

As shown in FIG. 3A, first of all, a reading-side substrate 108 is surface-coated with a 700 Å-thick transparent electrode film 107 by sputtering of ITO. Separately, as shown in FIG. 3B, a writing-side substrate 101 is provided with a color filter layer 102 including color filter segments of R, G and B according to pigment dispersion and then coated with a transparent electrode 103.

Figure 3C:
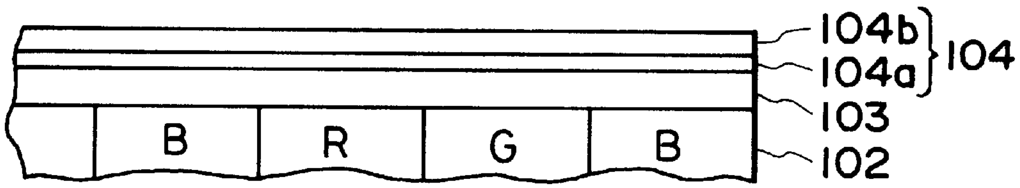
Figure 3D:
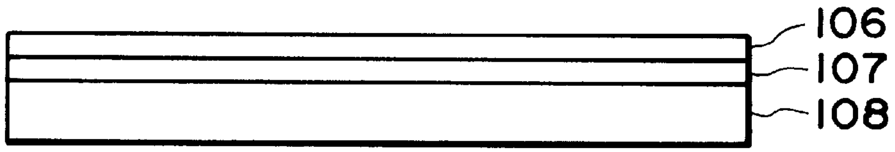

Then, as shown in FIG. 3C, over the transparent electrode 103 on the writing-side substrate, a dispersion liquid containing a charge generation substance is applied by spin coating and dried at 80° C. for 15 min. to form a charge generation layer 104*a*, which is then spin-coated with a dispersion liquid containing a charge-transporting substance, followed by drying at 120° C. for 60 min. to form a 0.70 μm-thick charge transport layer 104*b*. Thus, a laminate photoconductor layer 104 including the charge generation layer 104*a* and the charge transport layer 104*b* is completed. (On the other hand, it is also possible to use a single-layered photoconductor layer containing both a charge generation substance and a charge-transporting substance in mixture.)

Figure 6:
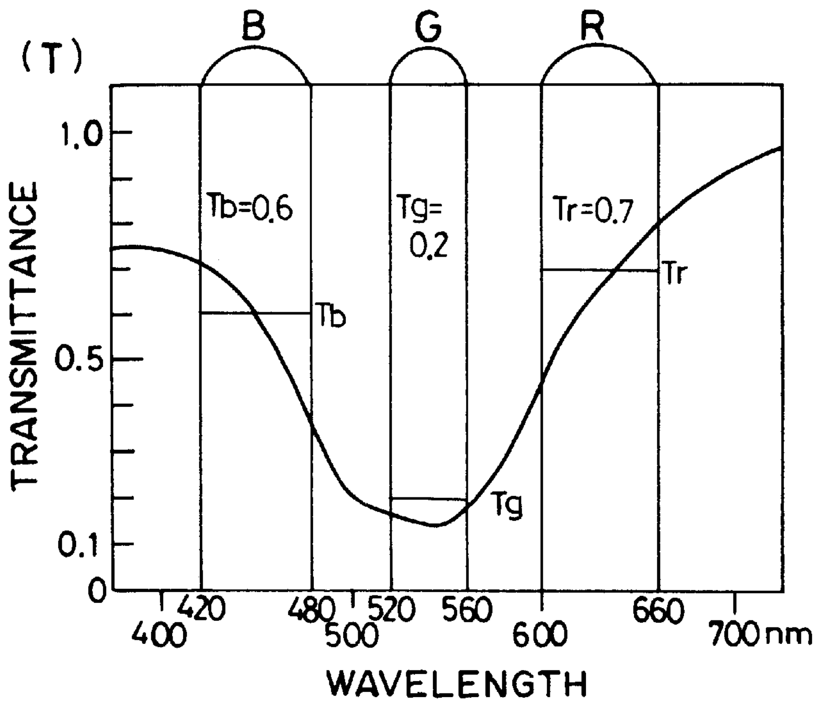
FIGS. 6 and 7 are graphs showing spectral transmittance and spectral sensitivity, respectively, of a photoconductor layer according to a first example used in the spatial light modulator.
Figure 7:
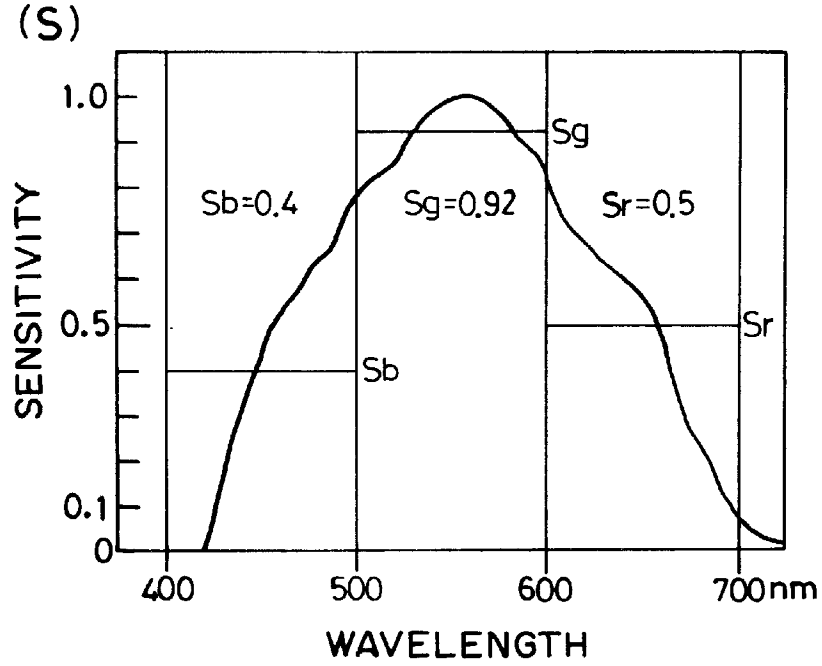

As a specific example, an OPC photoconductor layer 104 showing spectral transmittance and spectral sensitivity characteristics as shown in FIGS. 6 and 7, respectively, may be provided as a laminate including a charge generation layer 104 containing a charge generation substance of the following formula:

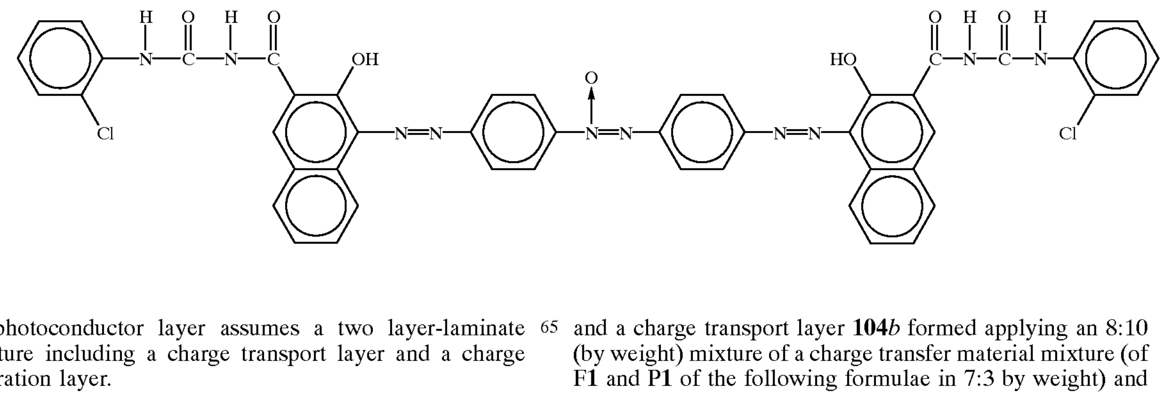

and a charge transport layer 104*b* formed applying an 8:10 (by weight) mixture of a charge transfer material mixture (of F1 and P1 of the following formulae in 7:3 by weight) and a binder mixture (of 5 wt. % of siloxane-containing polycarbonate and 95 wt. % of polycarbonate):

(F1)

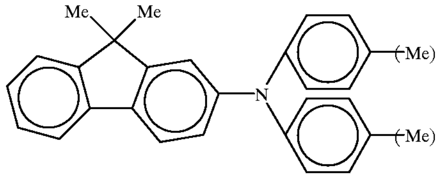

(P1)

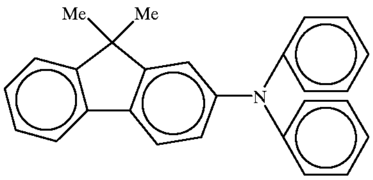

Then, as shown in FIG. 4D, the reading-side substrate 108 provided with the transparent electrode 107 is further coated with a polyimide-precursor liquid, followed by baking at 220° C. for 1 hour in an oven to form a 200 Å-thick polyimide alignment film 106, which is then rubbed by a nylon cloth. Further, a dispersion of 20.0 μm-dia. spacer beads in IPA (isopropyl alcohol) is applied by spin coating on the alignment film-side substrate 108 and dried at 110° C. for 5 min. in an oven.

Then, an epoxy resin-based sealing agent is applied (printed) along a periphery of the reading-side substrate 108, and after leveling, the writing-side substrate 101 is superposed thereon and applied thereon to form a superposed blank cell structure, which is then heated at 150° C. for 1 hour in an oven and then filled with a liquid crystal 13. For the liquid crystal filling (injection), the blank cell structure may be retained at 95° C. and then cooled at a rate of 1° C./min. As a final treatment after the liquid crystal injection, the cell may be heated to 110° C., gradually cooled at a rate of 0.1° C./min down to 90° C. and then cooled down to room temperature.

Figure 4:
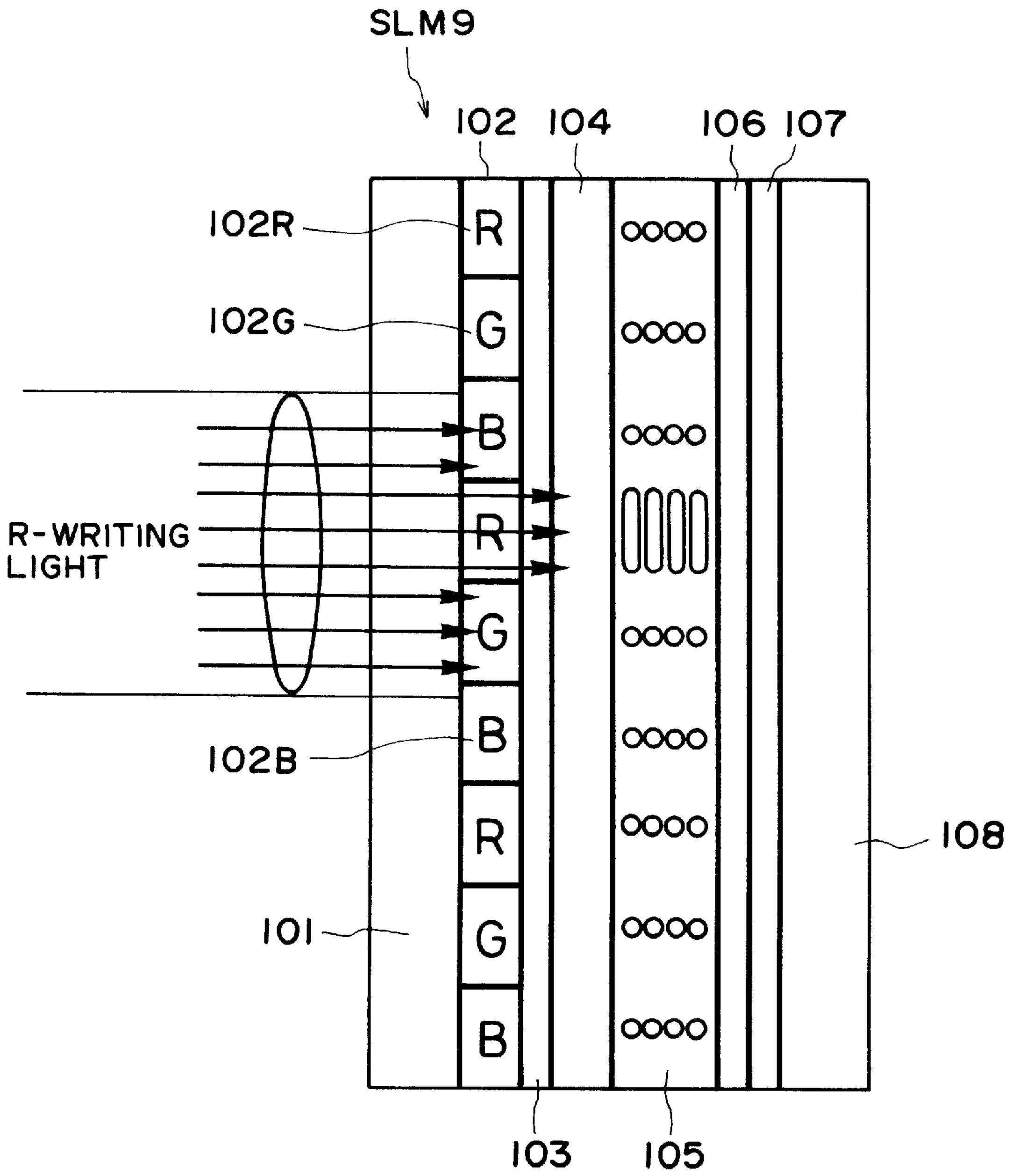
FIG. 4 illustrates an operation for writing in the spatial light modulator.
Figure 5:
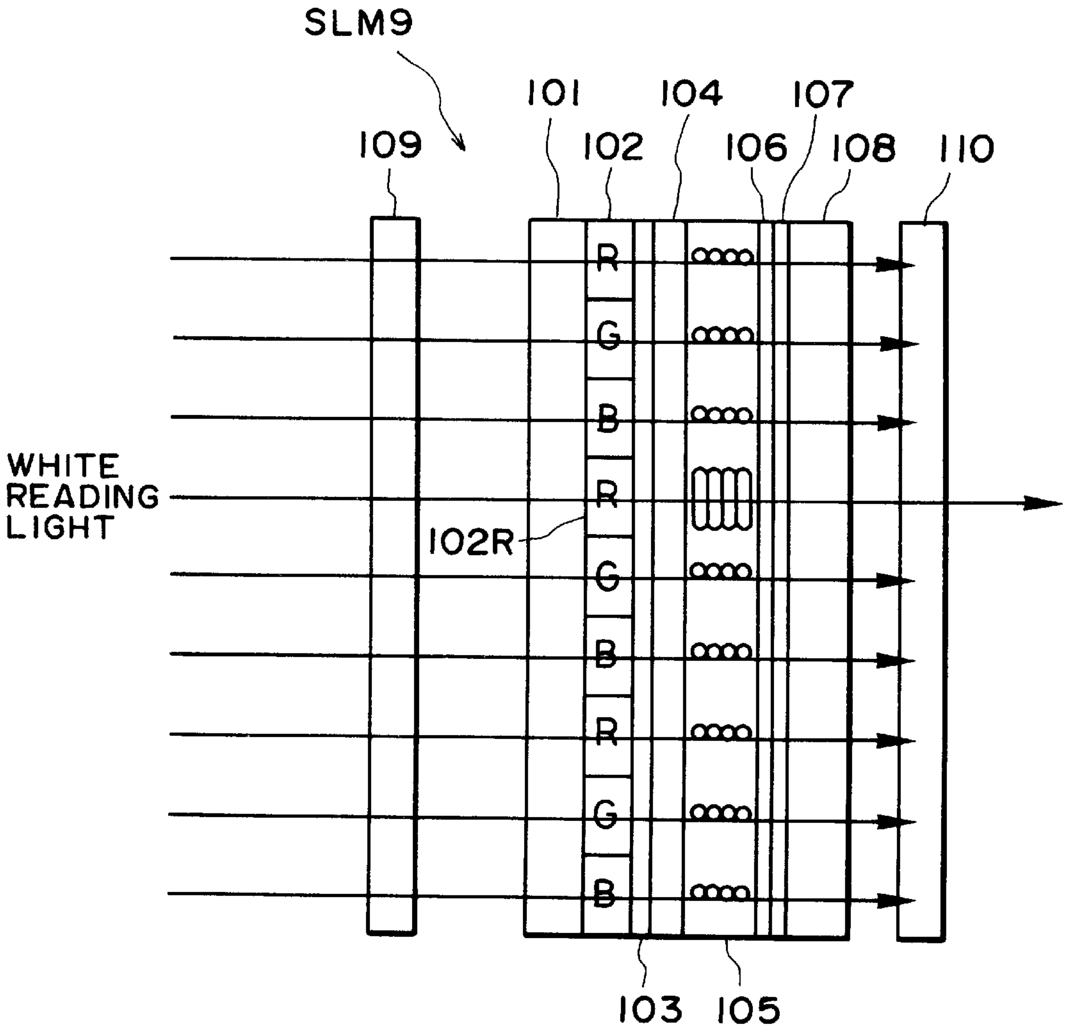
FIG. 5 illustrates an operation for reading out form the spatial light modulator.

After writing picture data in an SLM 9 prepared in the above-described manner in a manner as illustrated in FIG. 4, the SLM 9 is disposed between polarizers 109 and 110 arranged in cross nicols and illuminated with white reading light as shown in FIG. 5. In this instance, the respective parts may be provided with varying contrasts by changing the energy density of illumination light, and a positive-negative inversion may be effected by changing the direction of the polarizers 109 and 110 relative to the SLM 9.

At the time of writing picture data in the SLM 9, the writing light is incident to the photoconductor layer 104 through the color filter layer 102, while a prescribed DC voltage is applied between the transparent electrodes 103 and 107. As the writing light is incident to the photoconductor layer 104, the resistivity of the photoconductor layer 104 is lowered at portions thereof corresponding to the color filter segments of R, G and B in proportion to local illumination light quantity, where the optical modulation layer 105 is supplied with locally varying voltages (FIG. 4).

When the applied voltage locally exceeds the inversion threshold voltage of the optical modulation substance, the optical state thereof is locally changed from "bright" to "dark" or "dark" to "bright". As the optical modulation substance used herein is a liquid crystal having a memory characteristic, the written picture data is retained even if the writing light illumination is terminated. In this way, as it is not necessary to keep the application of a voltage for retaining picture data, power consumption can be reduced. On the other hand, if a reverse polarity voltage is applied, the memorized picture data is cleared or reset.

On the other hand, at the time of reading out picture data recorded or written in the optical modulation layer 105, a portion (pixel) of the optical modulation layer is illuminated through a corresponding color filter segment (R in FIG. 5).

Next, a principle of color picture display by using the FLC will be described with reference to FIG. 4 (illustrating a writing operation) and FIG. 5 (illustrating a readout operation).

Referring to FIG. 4, in the writing operation, when R-wavelength picture data-carrying light (R-writing light) is incident to a color filter layer 102, the light flux is incident to not only an R-filter segment 102R but also a G-filter segment 102G and a B-filter segment 102B, but light flux incident to the G- and B-segments other than the R-segment 102R is absorbed by the G- and B-segments 102G and 102B, thus being prevented from reaching the photoconductor layer 104.

On the other hand, R-wavelength light having passed through the R-filter segment 102R is absorbed by the photoconductor layer 104 to generate a charge in the charge generation layer 104*a* to be transported through the charge transport layer 104*b*, thus allowing an electric field applied between the transparent electrodes 101 and 108 to be applied by voltage division across the optical modulation layer 105 for driving the liquid crystal.

As a result, within an area illuminated by the R-wavelength writing light, portions of the liquid crystal corresponding to only R-filter segments 102R are caused to change an alignment state. By using G-wavelength writing light and B-wavelength light similarly, portions corresponding to G-filter segments 102G and B-filter segments 102B, respectively, are written with corresponding data.

On the other hand, in the readout operation, the cross nicol polarizers 109 and 110 are disposed to sandwich the SLM 9, e.g., in such a position that portions of the optical modulation layer 105 provide a bright state and the other portions provide a dark state, and white reading light is incident to the SLM from its writing side. The white light passes through the first polarizer 109 and the color filter layer 102 to form light fluxes of RGB, which are partially absorbed by the photoconductor layer 104 and are locally selectively subjected to optical rotation by the optical modulation layer 105 to enter the second polarizer 110. As the white reading light is caused to illuminate the SLM 9 from the side identical to the writing side, it is preferred that the optical modulation layer 105 exhibits an optical rotation power which is predominant over its birefringence power.

When the spatial light modulator 9 written in the manner illustrated in FIG. 4 by illumination with R-writing light is subjected to illumination with white-reading light, only a portion of reading light having passed through the R-filter segment 102R and the corresponding portion of the optical modulation layer 105 is allowed to pass through the second polarizer 110, and the remainder portion is absorbed by the second polarizer 110, so that the written data can be read out as an R-light image.

Figure 25:
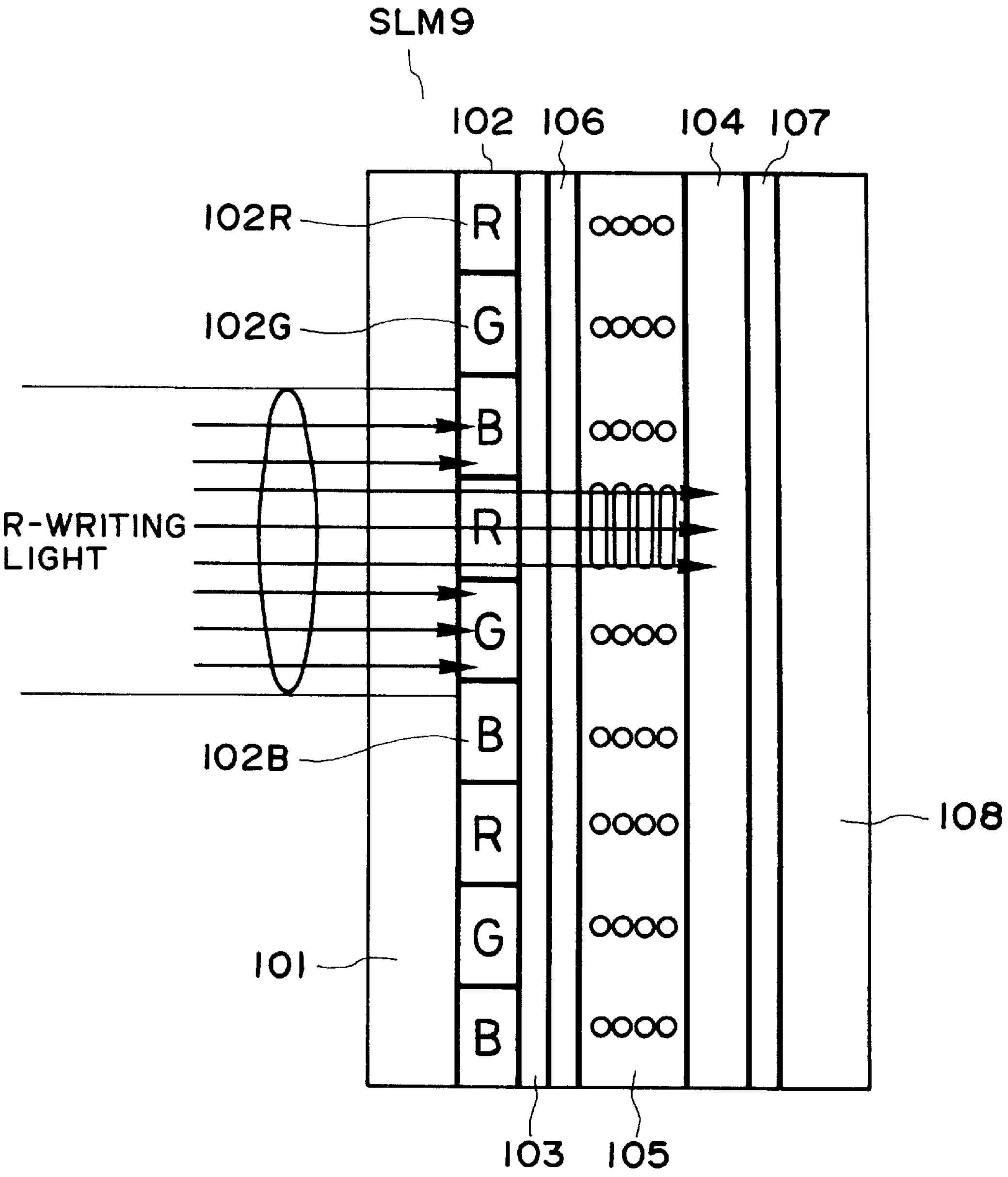
FIGS. 25 and 26 are sectional views each illustrating another embodiment of the spatial light modulator of the invention.
Figure 26:
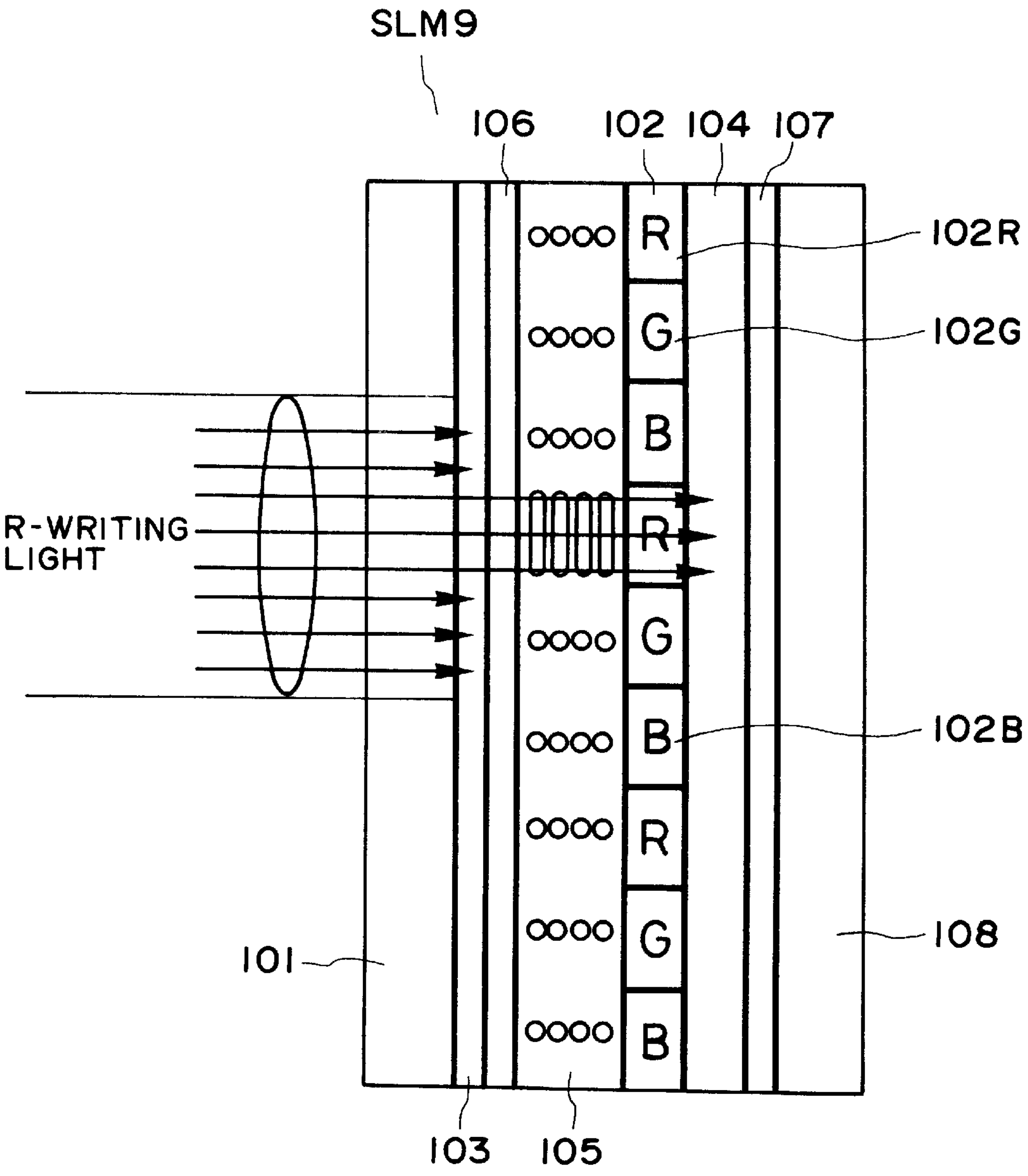

As described above, writing light is caused to enter the photoconductor layer 104 after passing through the color filter layer 102. On the other hand, reading light need not enter a photoconductor layer after passing through a color filter layer. Accordingly, in addition to the layer arrangement order shown in FIG. 4, it is possible to adopt an arrangement as shown in FIG. 25 wherein a color filter layer 102, an optical modulation layer and a photoconductor layer 104 are disposed in this order, or an arrangement as shown in FIG. 26 wherein an optical modulation layer 105, a color filter layer 102 and a photoconductor layer 104 are disposed in this order. A pair of transparent electrodes 103 and 107 may be disposed in any positions as far as they sandwich an optical modulation layer and a photoconductor layer.

Figure 8:
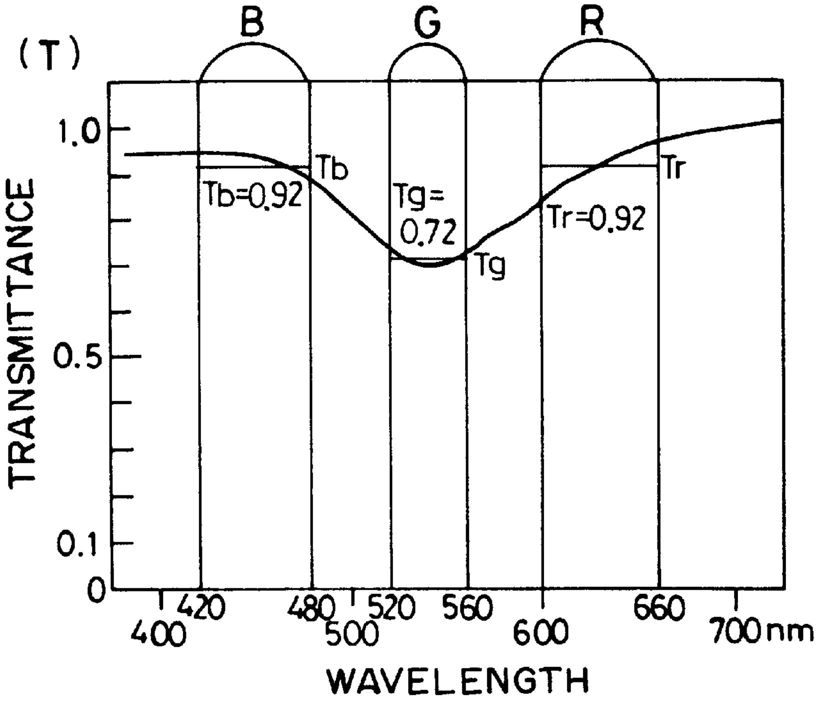
FIGS. 8 and 9 are graphs showing spectral transmittance and spectral sensitivity, respectively, of a photoconductor layer according to a second example used in the spatial light modulator.
Figure 9:
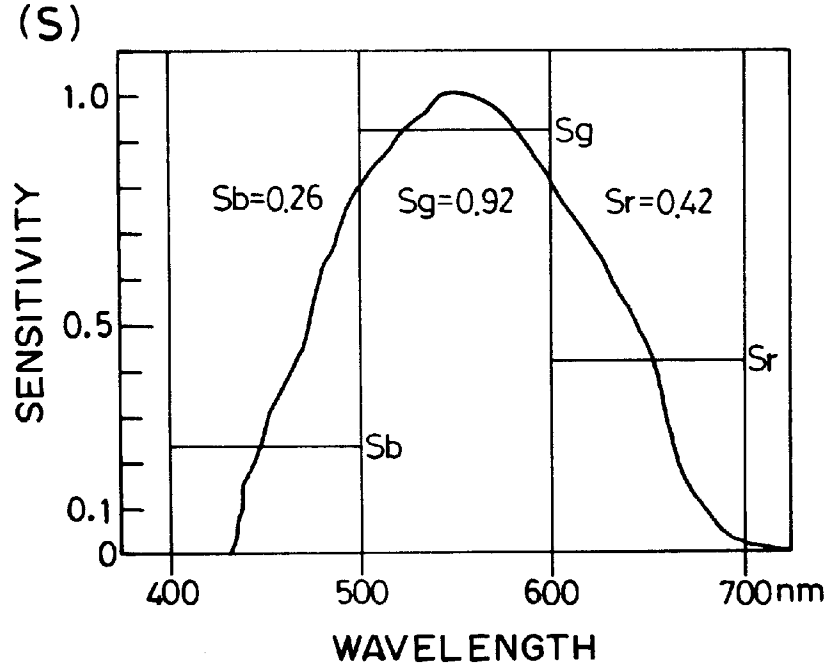
Figure 10:
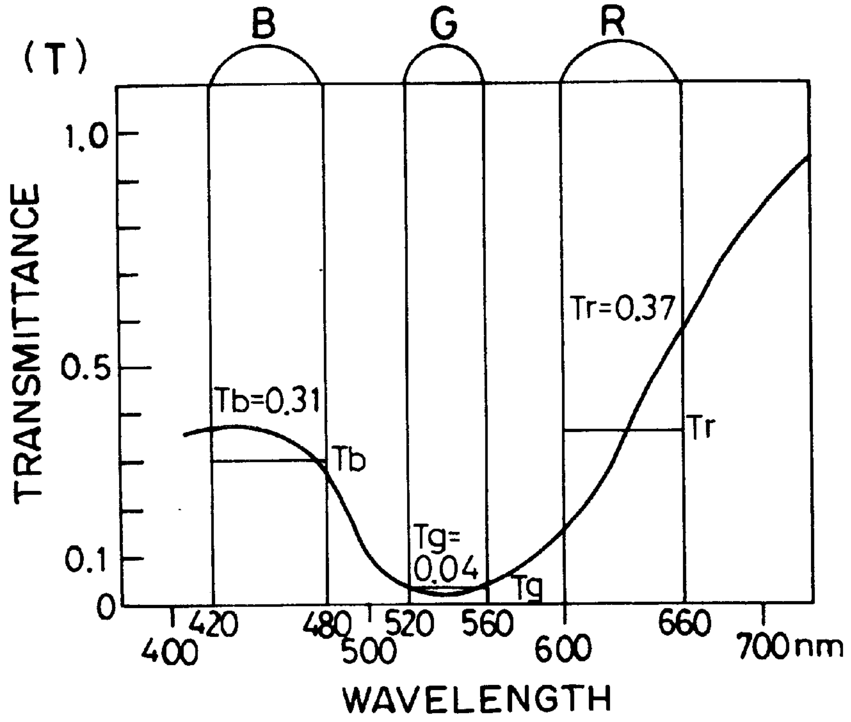
FIGS. 10 and 11 are graphs showing spectral transmittance and spectral sensitivity, respectively, of a photoconductor layer according to a third example used in the spatial light modulator.
Figure 11:
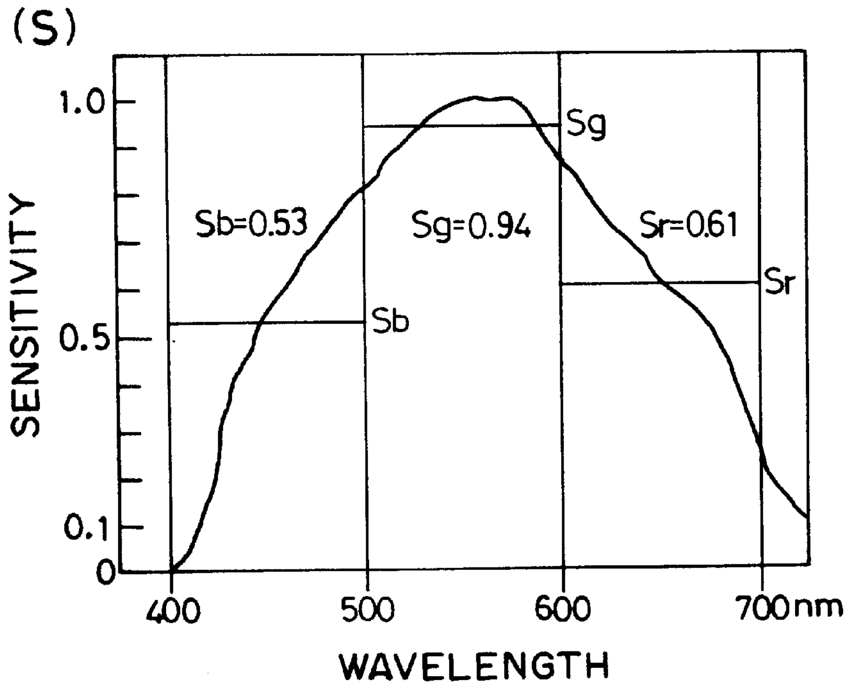

FIGS. 6, 8 and 10 are graphs each showing a spectral transmittance characteristic of a photoconductor layer used in the present invention, and FIGS. 7, 9 and 11 are graphs each showing a spectral sensitivity characteristic of such a photoconductor layer corresponding thereto. These graphs are based on experimental results for photoconductor layers obtained by using different combinations of a mixing ratio between a charge transport substance and a charge generation substance and a photoconductor layer thickness.

More specifically, FIG. 6 shows a spectral transmittance characteristic of a photoconductor layer which shows an average transmittance Tb of 0.6 in B-region having a wavelength range of 420–480 nm, an average transmittance Tg of 0.2 in G-region having a wavelength range of 520–560 nm and an average transmittance Tr of 0.7 in R-region having a wavelength range of 600–660 nm. Among the average transmittances Tb, Tg and Tr, a maximum one (Tr=0.7) and a minimum one (Tg=0.2) provide a ratio Tr/Tg=3.5<10.

On the other hand, FIG. 7 shows a spectral sensitivity characteristic of the photoconductor layer which shows an average sensitivity Sb of 0.4 to blue light in a wavelength range of 400–500 nm, an average sensitivity Sg of 0.92 to green light in a wavelength range of 500–600 nm and an average sensitivity Sr of 0.5 to red light in a range of 600–700 nm. Among the average sensitivities, a maximum one (Sg=0.92) and a minimum one (Sb=0.4) provide a ratio Sg/Sb=2.3<10.

As shown in the above embodiment of FIGS. 6 and 7, it may be convenient to use wavelength ranges of 400–500 nm, 500–600 nm and 600–700 nm or evaluating average sensitivities to blue, green and red light, respectively, whereas wavelength ranges of 420–480 nm, 520–560 nm and 600–660 nm for evaluating average transmittances for blue, green and red light, respectively. This is because an average sensitivity characteristic is principally questioned during writing wherein an entire wavelength range including ranges between peak wavelengths is utilized, whereas an transmittance characteristic is principally questioned during reading wherein limited wavelengths in proximity to peak wavelengths of a back light and thought much of for providing a good color separation characteristic.

FIG. 8 shows a spectral transmittance characteristic of another photoconductor layer used in the present invention which shows an average transmittance Tb of 0.92 in B-region having a wavelength range of 420–480 nm, an average transmittance Tg of 0.72 in G-region having a wavelength range of 520–560 nm, and an average transmittance Tr of 0.92 in R-region having a wavelength range of 600–660 nm. Among the average transmittances Tb, Tg and Tr, a maximum one (Tb, Tr=0.92) and a minimum one (Tg=0.72) provide a ratio Tb/Tg=1.3<10.

FIG. 9 shows a spectral sensitivity characteristic of the above photoconductor layer which shows an average sensitivity Sb of 0.26 to blue light in a wavelength range of 400–500 nm, an average sensitivity Sg of 0.92 to green light in a wavelength range of 500–600 nm and an average sensitivity Sr of 0.42 to red light in a wavelength range of 600–700 nm. Among the average sensitivities Sb, Sg and Sr, a maximum one (Sg=0.92) to a minimum one (Sb=0.26) provide a ratio Sg/Sb of 3.69<10.

FIG. 10 shows a spectral transmittance characteristic of another photoconductor layer used in the present invention which shows an average transmittance Tb of 0.31 in B-region having a wavelength range of 420–480 nm, an average transmittance Tg of 0.04 in G-region having a wavelength range of 520–560 nm, and an average transmittance Tr of 0.37 in R-region having a wavelength range of 600–660 nm. Among the average transmittances Tb, Tg and Tr, a maximum one (Tr=0.37) and a minimum one (Tg=0.04) provide a ratio Tb/Tg=9.25<10.

FIG. 11 shows a spectral sensitivity characteristic of the above photoconductor layer which shows an average sensitivity Sb of 0.53 to blue light in a wavelength range of 400–500 nm, an average sensitivity Sg of 0.94 to green light in a wavelength range of 500–600 nm and an average sensitivity Sr of 0.61 to red light in a wavelength range of 600–700 nm. Among the average sensitivities Sb, Sg and Sr, a maximum one (Sg=0.94) to a minimum one (Sb=0.53) provide a ratio Sg/Sb of 1.8<10.

Figure 12:
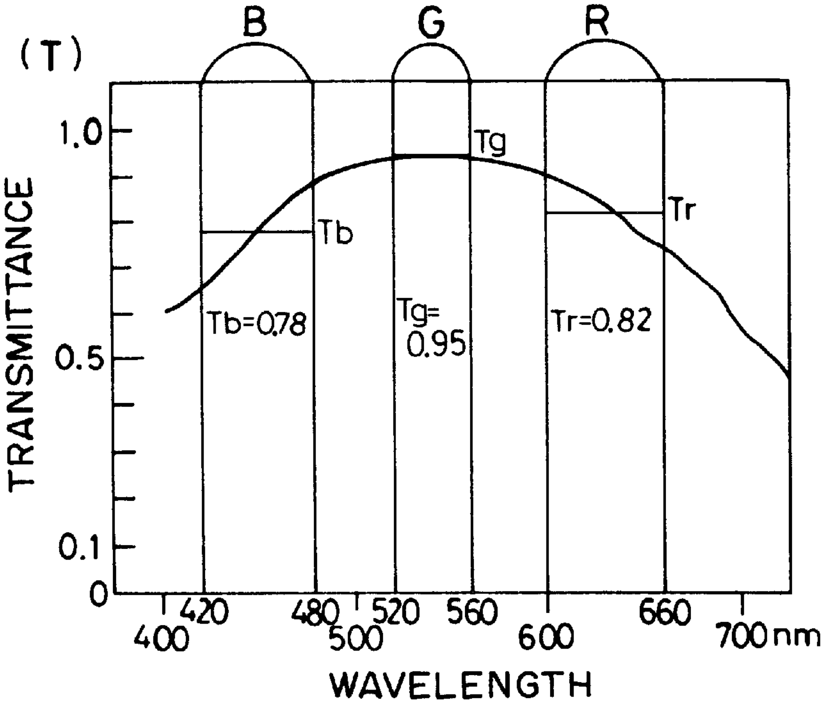
FIGS. 12 and 13 are graphs showing spectral remittance and spectral sensitivity, respectively, of a conventional organic photoconductor layer for spatial light modulator.

On the other hand, FIG. 12 shows a spectral transmittance characteristic of a conventional OPC for SLM which shows an average transmittance Tb of 0.78 in B-region having a wavelength range of 420–480 nm, an average transmittance Tg of 0.95 in G-region having a wavelength range of 520–560 nm, and an average transmittance Tr of 0.82 in R-region having a wavelength range of 600–660 nm. Among the average transmittances Tb, Tg and Tr, a maximum one (Tg=0.95) and a minimum one (Tg=0.78) provide a ratio Tb/Tg=1.2<10.

Figure 13:
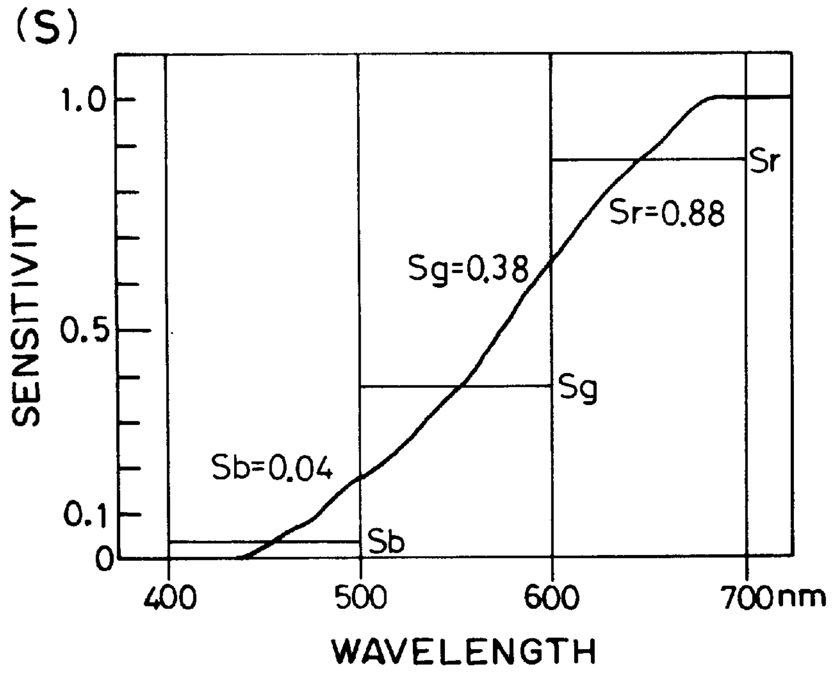

FIG. 13 shows a spectral sensitivity characteristic of the conventional OPC for SLM which shows an average sensitivity Sb of 0.04 to blue light in a wavelength range of 400–500 nm, an average sensitivity Sg of 0.38 to green light in a wavelength range of 500–600 nm and an average sensitivity Sr of 0.88 to red light in a wavelength range of 600–700 nm. Among the average sensitivities Sb, Sg and Sr, a maximum one (Sr=0.88) to a minimum one (Sb=0.04) provide a ratio Sr/Sb of 22<10.

Figure 14:
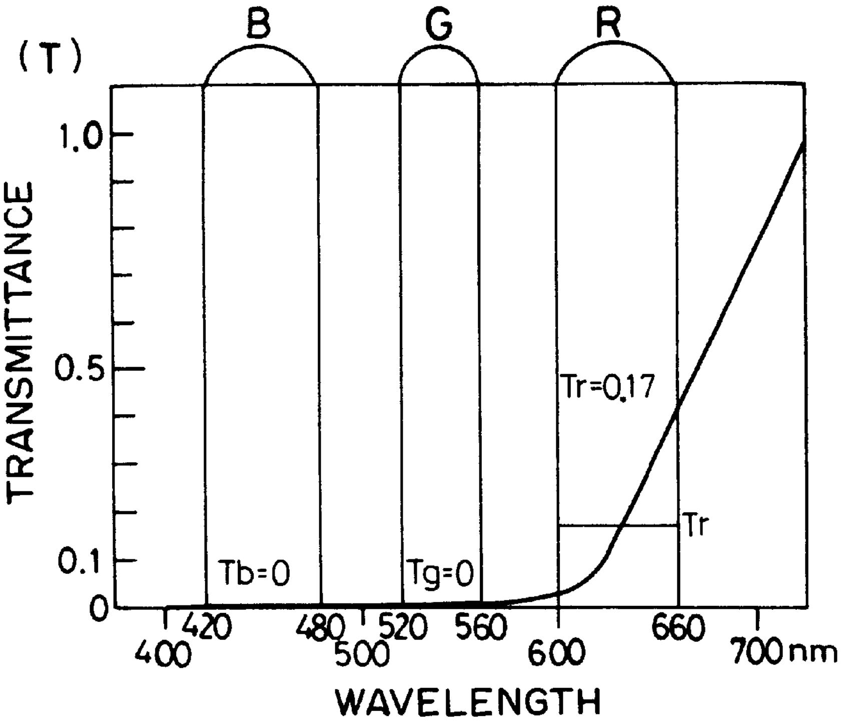
FIGS. 14 and 15 are graphs showing spectral remittance and spectral sensitivity, respectively, of a conventional amorphous-Si layer for spatial light modulator.

Further, FIG. 14 shows a spectral transmittance characteristic of a conventional a-Si for SLM which shows an average transmittance Tb of 10 in B-region having a wavelength range of 420–480 nm, an average transmittance Tg of 0 in G-region having a wavelength range of 520–560 nm, and an average transmittance Tr of 0.17 in R-region having a wavelength range of 600–660 nm. Among the average transmittances Tb, Tg and Tr, a maximum one (Tr=0.17) and a minimum one (Tg=0) provide a an infinitely large ratio (i.e., >10).

Figure 15:
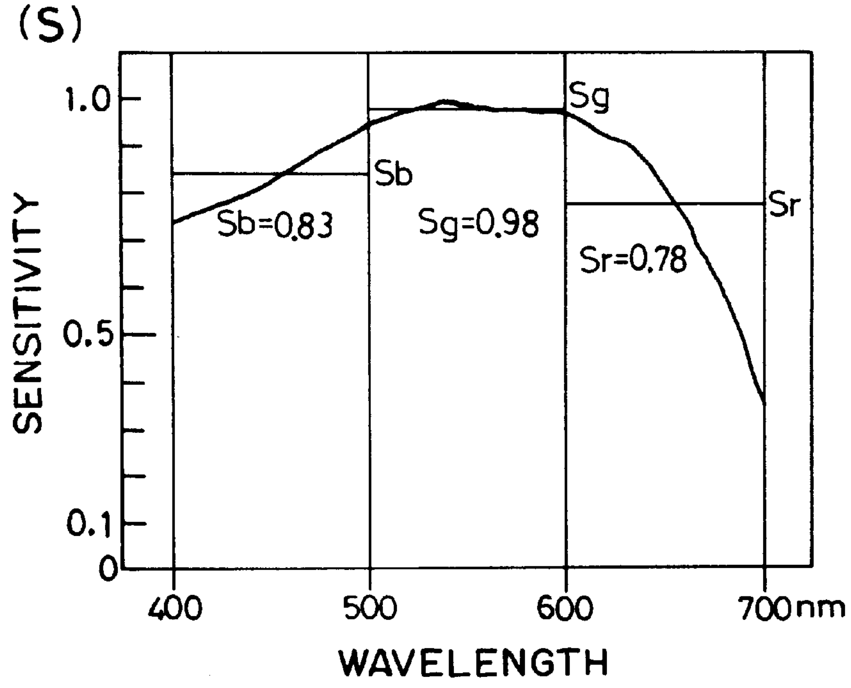

FIG. 15 shows a spectral sensitivity characteristic of the conventional a-Si for SLM which shows an average sensitivity Sb of 0.83 to blue light in a wavelength range of 400–500 nm, an average sensitivity Sg of 0.98 to green light in a wavelength range of 500–600 nm and an average sensitivity Sr of 0.78 to red light in a wavelength range of 600–700 nm. Among the average sensitivities Sb, Sg and Sr, a maximum one (Sg=0.98) to a minimum one (Sr=0.78) provide a ratio Sg/Sr of 1.3<10.

Figure 16:
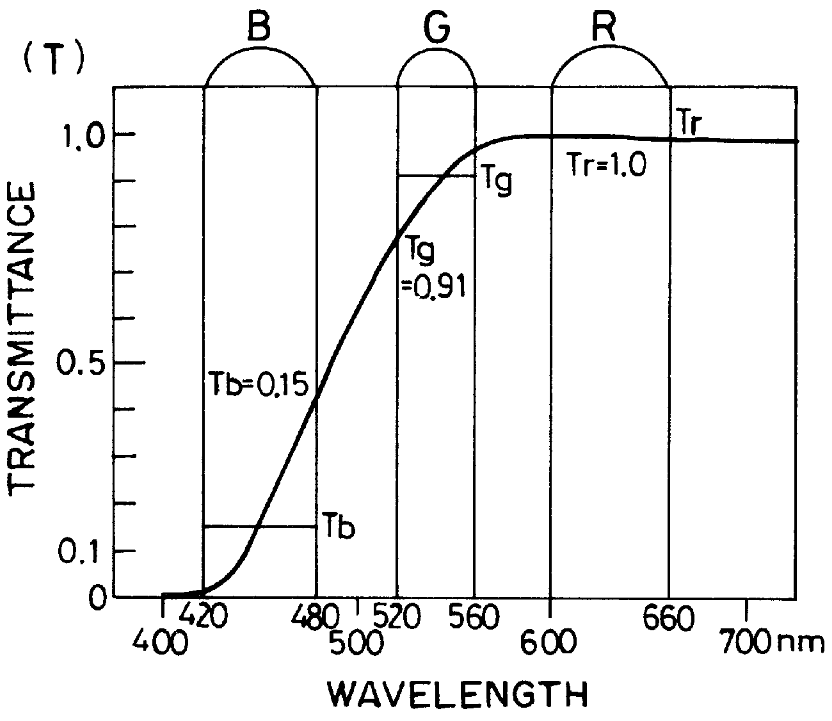
FIGS. 16 and 17 are graphs showing spectral remittance and spectral sensitivity, respectively, of a conventional amorphous-SiC layer for spatial light modulator.

FIG. 16 shows a spectral transmittance characteristic of another conventional a-Si for SLM which shows an average transmittance Tb of 0.92 in B-region having a wavelength range of 420–480 nm, an average transmittance Tg of 0.91 in G-region having a wavelength range of 520–560 nm, and an average transmittance Tr of 1.0 in R-region having a wavelength range of 600–660 nm. Among the average transmittances Tb, Tg and Tr, a maximum one (Tr=1.0) and a minimum one (Tg=0.11) provide a ratio Tb/Tg=9.1<10.

Figure 17:
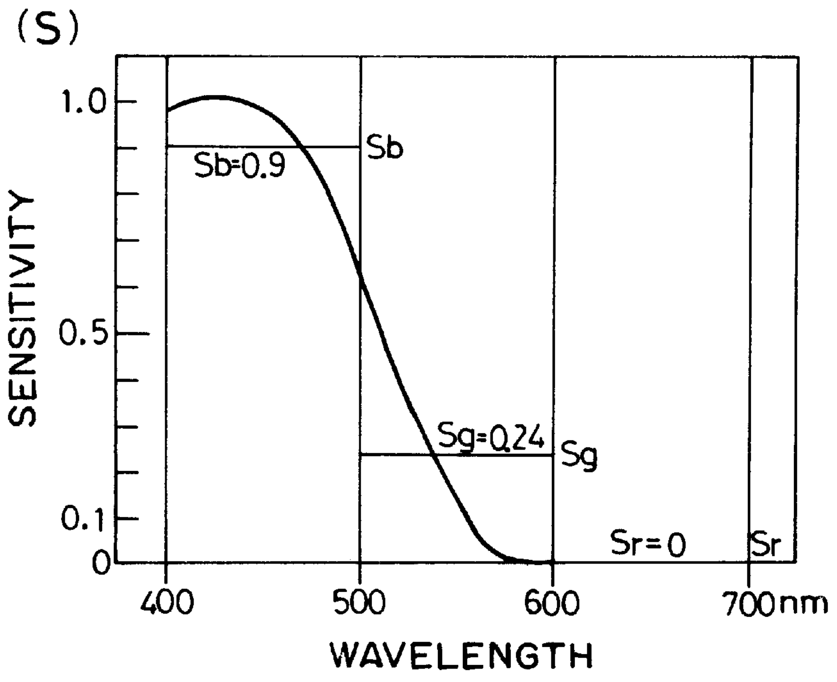

FIG. 17 shows a spectral sensitivity characteristic of the above a-Si for SLM which shows an average sensitivity Sb of 0.9 to blue light in a wavelength range of 400–500 nm, an average sensitivity Sg of 0.24 to green light in a wavelength range of 500–600 nm and an average sensitivity Sr of 0 to red light in a wavelength range of 600–700 nm. Among the average sensitivities Sb, Sg and Sr, a maximum one (Sb=0.9) to a minimum one (Sr=0) provide an infinitely large ratio (i.e., >10).

Figure 18:
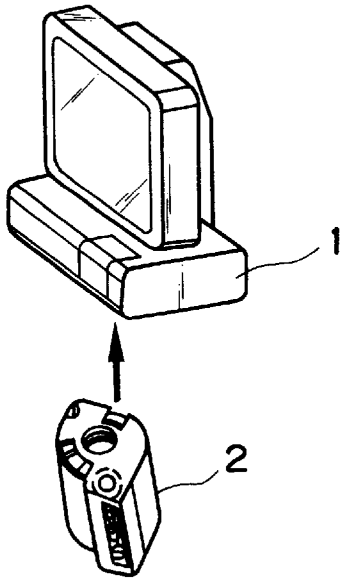
FIG. 18 is a schematic illustration of a picture-forming apparatus or picture display apparatus using a spatial light modulator of the invention.
Figure 19:
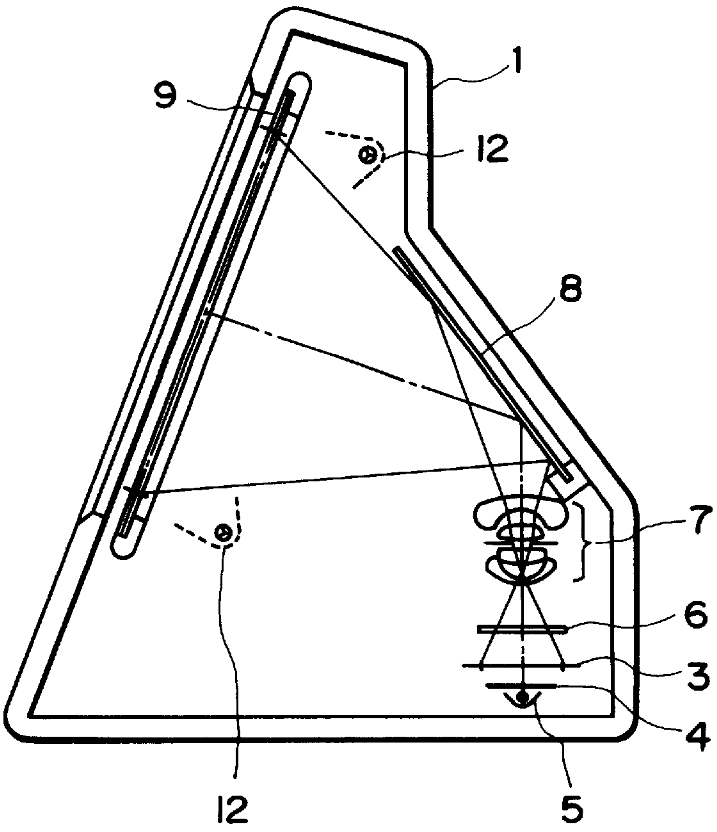
FIG. 19 is a sectional view of the picture-forming apparatus.

FIGS. 18 and 19 illustrate a picture-forming apparatus or picture display apparatus using a spatial light modulator of the present invention. FIG. 18 is a schematic illustration of such a picture display apparatus, wherein an already developed IX 240 film (hereinafter called D-cart.) 2 as a negative film is loaded in a picture display apparatus 1, whereby photographed pictures are displayed as high-resolution images after negative-positive inversion.

FIG. 19 is a sectional view of the picture display apparatus, wherein a developed negative film 3 carrying a photographed picture is pulled out of D-cart. 2 and set in position frame by frame by a known film advance mechanism (not shown). Below the film 3 is disposed a strobe device 5, and a milky white diffusion plate 4 is disposed between the negative film 3 and the strobe device 5 so that emitted light from the strobe device 5 is uniformly diffused to illuminate the negative film 3. The strobe device 5 may be one used for a camera, etc., and may comprise a Xe (xenone) lamp, a reflection shade, a luminescent circuit, etc., so as to cause light emission in response to a known microprocessor (not shown).

Above the film 3, an orange base-removal filter 6 is disposed for removing an orange tint from the negative image and comprises an optical film of blue that is complementary color of the orange. A projection lens 7 is disposed thereabove so as to enlarge a negative picture on the negative film 3 at a prescribed magnification and project the enlarged image onto a photoconductor layer in SLM 9 via a reflection mirror 8. The SLM 9 is illuminated by a linear tube type illumination device 12, frequently used as a backlight in a flat display, etc.

Figure 20:
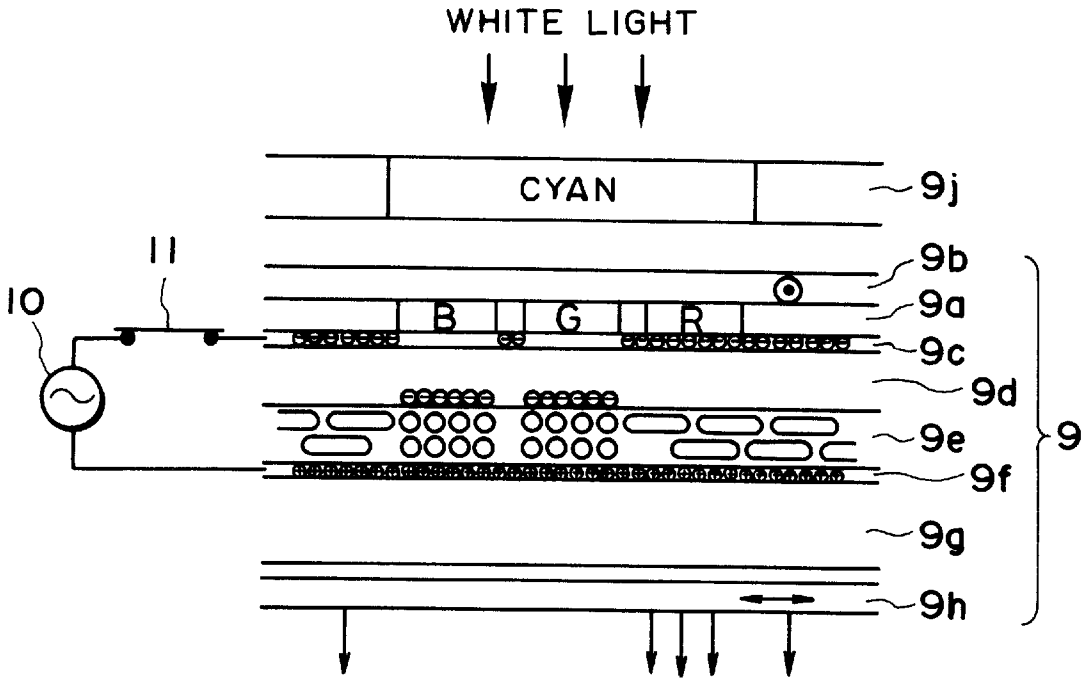
FIG. 20 is a schematic sectional illustration of an operation for writing in the picture-forming apparatus.
Figure 21:
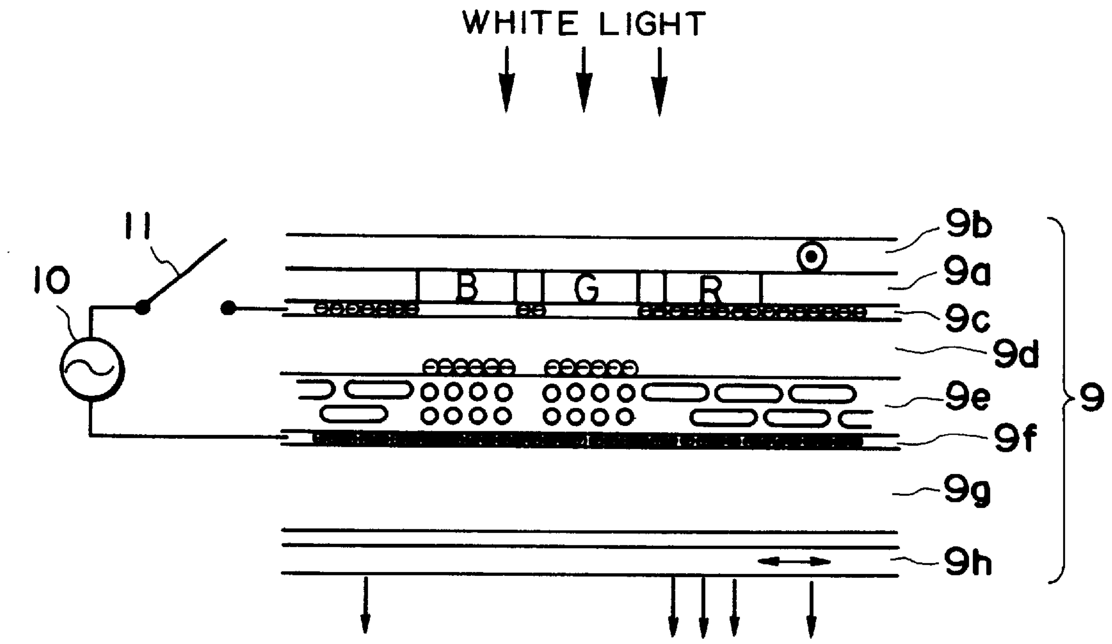
FIG. 21 is a schematic sectional illustration of a state of viewing the picture-forming apparatus.

FIGS. 20 and 21 illustrate the organization and function of an SLM 9 during picture writing and picture viewing, respectively. Referring to these figures, the SLM 9 includes a color filter layer 9*a* composed of RGB color filter segments which may preferably comprise one of a fine resolution-type as used in a CCD image sensor for a video camera, etc., as it allows observation of a silver salt picture without deterioration, for the picture display apparatus 1.

The SLM 9 further includes a pair of polarizers 9*b* and 9*h* as a polarization device sandwiching a liquid crystal layer 9*e*. The polarizer 9*b* has a polarization direction perpendicular to the drawing paper and the polarizer 9*h* has a lateral polarization direction parallel to the drawing paper, thus assuming a so-called cross nicol arrangement. The liquid crystal layer 9*e* is disposed between transparent conductor films 9*c* and 9*f*, which are ordinarily composed of ITO (indium tin oxide), etc., and driven by a drive circuit (detail not shown) as schematically represented by a power supply 10 and a switch 11 so as to generate opposite polarities of potentials at the ITO films 9*c* and 9*f*.

Between the ITO films 9*c* and 9*f*, a photoconductor layer 9*d* of an OPC (organic photoconductor) and the liquid crystal layer 9*e* are disposed in contact with each other. The liquid crystal layer 9*e* may be composed of FLC and disposed between and in contact with the photoconductor layer 9*d* and the ITO film 9*f*. At least one side of the SLM 9 may be provided with a glass sheet 9*g* for providing a rigidity and protecting the other layers. During the picture writing, a negative picture schematically illustrated as a sheet image 9*j* is incident to the SLM as a result of projection from the above-mentioned negative film 3 via the projection lens 7.

Now, the operation of the picture display apparatus 1 will be described with reference to a flow chart in FIG. 22.

Figure 22:
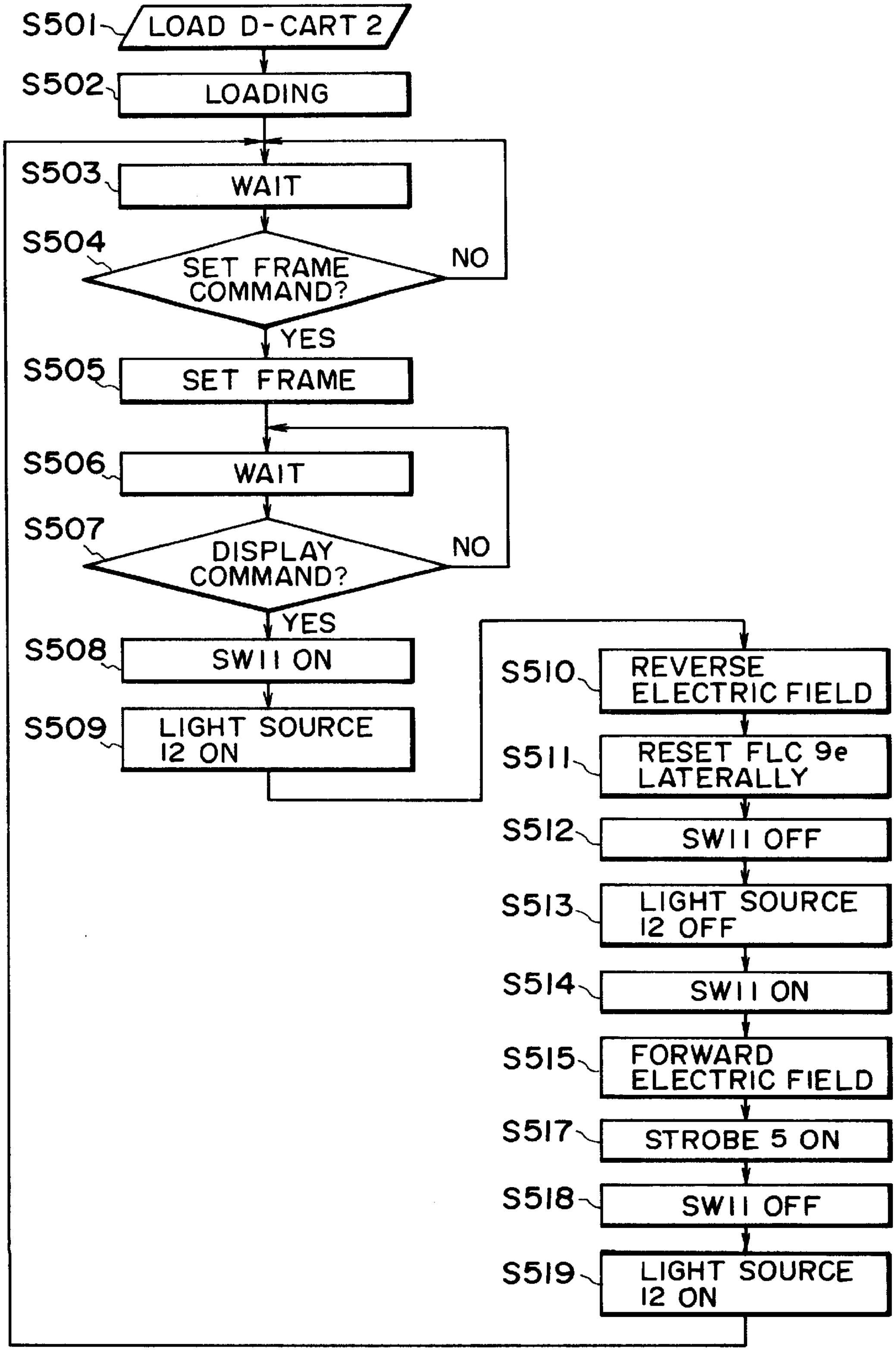
FIG. 22 is a flow chart for illustrating a picture display operation of the picture-forming apparatus.
Figure 23:
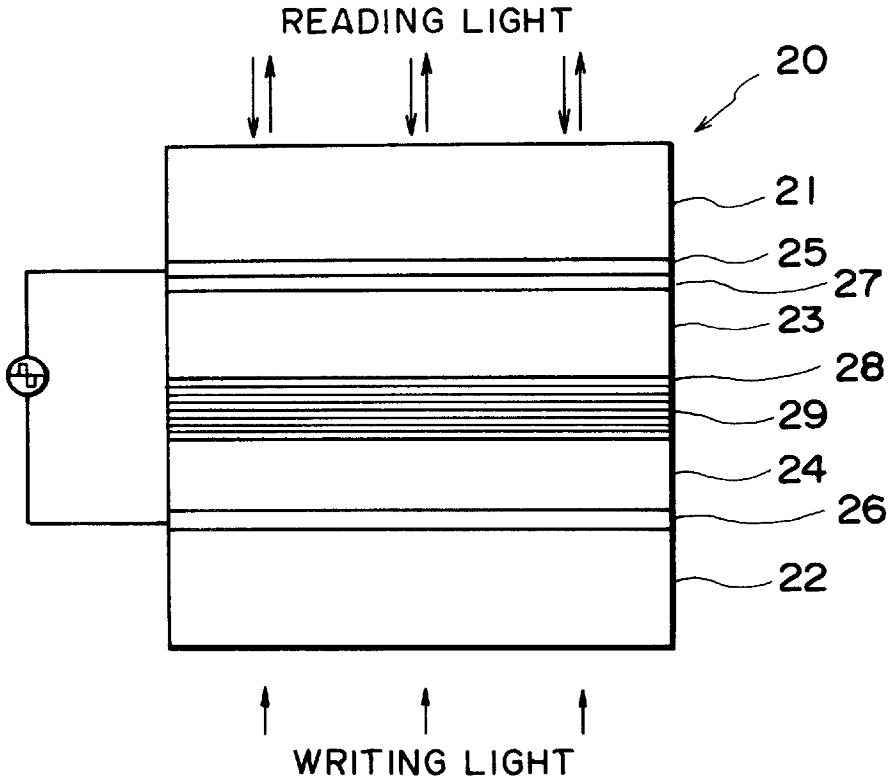
FIG. 23 and 24 are sectional views each illustrating a conventional spatial light modulator.
Figure 24:
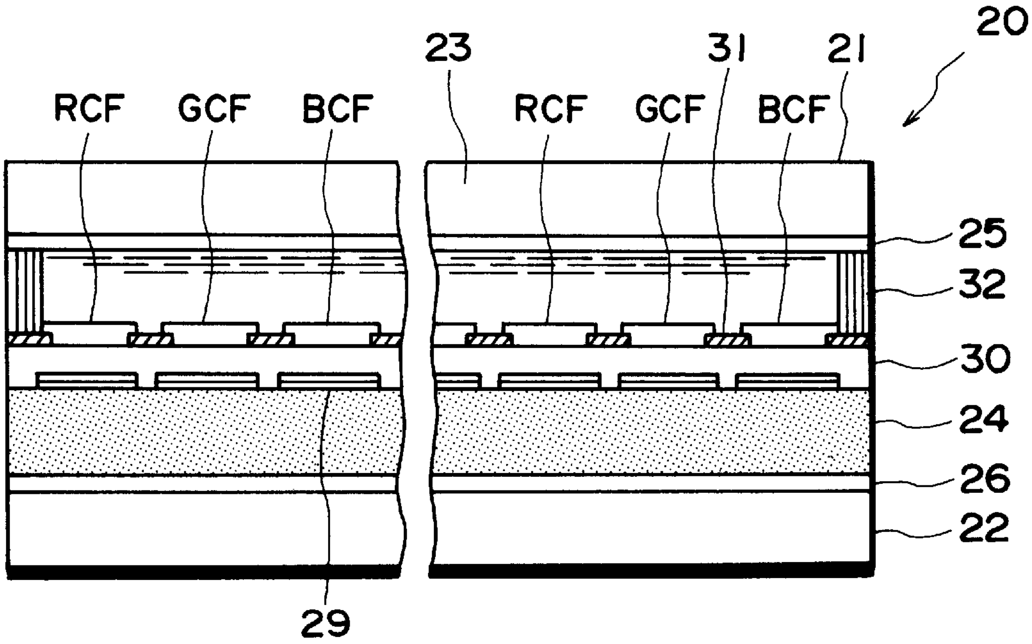

Referring to FIG. 22, when a D-cart. 2 is loaded in the picture display apparatus 1 so as to view pictures recorded therein (S501), the display apparatus 1 performs a loading operation including a thrusting operation for sending out a negative film 3 out of the D-cart. 2 and setting a first frame of the D-cart. 2 in position as shown in FIG. 19 (i.e., at an aperture (not shown) of the display apparatus 1) to stop the film supply (S502). In this state, the display apparatus 1 is placed in a waiting mode for waiting signals from respective switches (not shown) (S503).

In this state, when a frame-setting command for advancing a prescribed frame for viewing is inputted (S504), a frame-setting operation is started to set the prescribed frame at the aperture of the display apparatus 1 (S505), and the apparatus waits for a command as to whether the frame is displayed or not (S506).

When a display command is received from the user in this state (S507), the picture of a previously displayed frame is cleared by turning on the switch 11 to form a voltage application state (S508), turning on the illumination device (S509) and applying an electric field from the power supply 10 in a direction reverse to that applied at the time of writing (S510).

As a result of the reverse electric field application, molecules of FLC 9*e* are entirely reset in a state of lateral extension (as locally illustrated in FIG. 20) (S511). The resetting electric field application is performed for a time sufficient to place all the pixels in the reset state. In this state, the switch 11 may be turned off (made open) (S512) and the illumination device may be turned off (S513).

Then, a fresh picture writing operation may be started.

Now, if it is assumed that the picture display apparatus 1 placed on an office desk or on a wall at home and under illumination at several hundred lux, such environmental light is reduced to about a half after passing through the polarizer 9*b* to be incident to the photoconductor layer 9*d*. In this state, however, the switch 11 is open (as shown in FIG. 21) so that the FLC 9*e* is not supplied with an electric field and does not cause any reaction.

In this state, the switch 11 is turned on (S514) to apply a forward electric field for picture writing between the ITO films 9*c* and 9*f* (S515), and the strobe device 5 is turned on to project image light through the negative film 3 onto the SLM 9.

The writing operation is performed while the environmental light is also incident to the SLM 9 and, accordingly, it should be performed quickly so that the projection light has a prescribed S/N ratio or above relative to the environmental light. As the strobe light emission is completed within a time of ca. 500 $\mu$sec., the switch 11 is turned on for a period comparable to and in synchronism with the strobe light emission (S514–S517).

A picture thus recorded in the SLM 9 is illuminated by turning on the illumination device 12 to be observed as transmitted light image to the user (S518). Then, the display apparatus 1 is placed in the waiting mode for awaiting a subsequent command (S503), and the picture is continually displayed on the display apparatus.

As described above, since it is possible to write in the SLM by supplying an electric field to the photoconductor layer 9*d* for a short period in synchronism with the lighting of the strobe device 5, it becomes possible to unnecessitate a shading cover for screening the SLM 9 from the environmental light, so that a high-resolution picture-forming apparatus can be formed in a smaller size. The written picture in a memory state after termination of the electric field application can be illuminated for viewing by a small power consumption light source, such as a fluorescent lamp, different from the writing light source.

The polarizer 9*b* may be disposed in such a movable form that it is inserted between the spatial light modulator 9 and the light source 12 at the time of viewing and retreated from the position at the time of writing.

As described above, according to the present invention, there is provided a picture forming and display apparatus including a spatial light modulator that can be written in with color picture data and can be read therefrom as visible color picture data by illuminating white light having a flat spectral distribution through a color filter in a same direction both for writing and reading, so that a complicated optical system including a reflection mirror and a screen as required in a reflection-type apparatus. As a result, such a picture forming and display apparatus can be produced through a simple process and at a lower production cost.

What is claimed is:

1. A spatial light modulator, comprising a pair of transparent substrates, and a photoconductor layer, an optical modulation layer and a color filter layer disposed in lamination between the substrates, wherein the photoconductor layer has a spectral sensitivity characteristic including an average sensitivity to blue light, an average sensitivity to green light and an average sensitivity to red light, of which a maximum and a minimum provide a ratio $S_{MAX}/S_{MIN}$ therebetween of at most 10, and a spectral transmittance characteristic including an average transmittance in a wavelength range of 420–480 nm, an average transmittance in a wavelength range of 520–560 nm and an average transmittance in a wavelength range of 600–660 nm, of which a maximum and a minimum provide a ratio $T_{MAX}/T_{MIN}$ of at most 10.

2. A spatial light modulator according to claim 1, wherein said blue light has a wavelength range of 400–500 nm, said green light has a wavelength range of 500–600 nm and said red light has a wavelength range of 600–700 mm.

3. A spatial light modulator according to claim 1, wherein no reflection mirror is inserted between the photoconductor layer and the optical modulation layer.

4. A spatial light modulator according to claim 1, wherein said photoconductor layer comprises an organic photoconductor.

5. A spatial light modulator according to claim 4, wherein said photoconductor layer has a laminate structure including a charge generation layer and a charge transport layer.

6. A spatial light modulator according to claim 1, wherein optical modulation layer comprises a liquid crystal.

7. A spatial light modulator according to claim 6, wherein said optical modulation layer comprises a liquid crystal having a memory characteristic.

8. A spatial light modulator according to claim 1, wherein said photoconductor layer and said optical modulation layer are disposed in contact with each other.

9. A spatial light modulator according to claim 1, wherein said photoconductor layer has a laminate structure including a charge generation layer and a charge transport layer, and the charge transport layer is in contact with the optical modulation layer.

10. A spatial light modulator according to claim 1, wherein said color filter layer, said photosensitive layer and said optical modulation layer are disposed in this order between the pair of transparent substrates.

11. A spatial light modulator according to claim 1, wherein said color filter layer, said color filter layer, said optical modulation layer and said photoconductor layer are disposed in this order between the pair of transparent substrates.

12. A spatial light modulator according to claim 1, wherein said optical modulation layer, said color filter layer and said photoconductor layer are disposed in this order between the pair of transparent electrodes.

13. A spatial light modulator according to claim 1, wherein the ratio $S_{MAX}/S_{MIN}$ is at most 5.0, and the ratio $T_{MAX}/T_{MIN}$ is at most 3.0.

14. A spatial light modulator according to claim 1, wherein said color filter comprises a plurality of different colors of color filter segments separated from each other with a masking part.

15. A spatial light modulator according to claim 14, wherein said color filter layer further includes a transparent layer covering the plurality of different colors of color filter segments.

16. A spatial light modulator according to claim 14, wherein the color filter segments of an identical color are disposed in stripes.

17. A spatial light modulator according to claim 14, wherein said color filter segments are arranged in a mosaic form.

18. A picture-forming apparatus, comprising: a spatial light modulator according to claim 1, and a writing light source disposed in a position suitable for illuminating the photoconductor layer through the color filter layer.

19. A picture-forming apparatus according to claim 18, further including a reading light source disposed in a position suitable for illuminating the optical modulation layer through the color filter layer.

20. A picture-forming apparatus according to claim 19, further including a polarization device movably disposed in a position suitable for insertion between spatial light modulator and the reading light source at a time of writing and retreating from a position between the spatial light modulator and the writing light source.

21. A picture-forming apparatus according to claim 19, further including a polarization device provided integrally to a viewing side of the spatial light modulator.

* * * * *

UNITED STATES PATENT AND TRADEMARK OFFICE
CERTIFICATE OF CORRECTION

PATENT NO. : 6,031,655

DATED : February 29, 2000

INVENTOR(S) : MINETO YAGYU

It is certified that error appears in the above-identified patent and that said Letters Patent is hereby corrected as shown below:

ON COVER PAGE AT [56], REFERENCES CITED
Attorney Agent, or Firm

"Fitzpatrick,Cella, Harper & Scinto"
should read
--Fitzpatrick, Cella, Harper & Scinto--.

Column 1
Line 33, "layer" should read --layer is--;
Line 57, "long step" should read --lengthy steps--.

Column 2
Line 19, "to" should read --to be--;
Line 61, "form" should read --from--.

Column 3
Line 4, "of" should read --of the--;
Line 12, "form" should read --from--.

UNITED STATES PATENT AND TRADEMARK OFFICE
CERTIFICATE OF CORRECTION

PATENT NO. : 6,031,655

DATED : February 29, 2000

INVENTOR(S) : MINETO YAGYU

It is certified that error appears in the above-identified patent and that said Letters Patent is hereby corrected as shown below:

Column 4
Line 10, "of" should read --of the--;
Line 17, "treatment" should read --treatment.--;
Line 30, "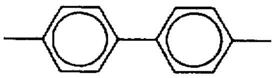" should read--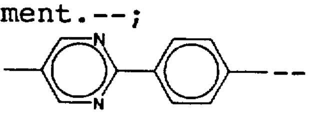--;
Line 44, "$-OCH_3C_7H_{15}$" should read --$-OCH_2C_7F_{15}$--.

Column 5
Line 27, "600nm 660nm," should read --600 – 660nm,--.

Column 6
Line 2 "(amorphous-)" should read --amorphous-)--;
Line 19 "me." should read --the inventor.--.

Column 9
Line 44 "an" should read --a--.

Column 10
Line 46, "a an" should read --an--.

UNITED STATES PATENT AND TRADEMARK OFFICE
CERTIFICATE OF CORRECTION

PATENT NO. : 6,031,655

DATED : February 29, 2000

INVENTOR(S) : MINETO YAGYU

It is certified that error appears in the above-identified patent and that said Letters Patent is hereby corrected as shown below:

Column 12
Line 38, "placed" should read --is placed--.

Column 13
Line 53, "optical" should read --said optical--.

Column 14
Line 14, delete "said color filter layer", (second occurrence);
Line 39, "comprising:" should read --comprising--;
Line 49, "spatial" should read --the spatial--.

Signed and Sealed this

Seventeenth Day of April, 2001

Attest:

NICHOLAS P. GODICI

*Attesting Officer*

*Acting Director of the United States Patent and Trademark Office*